(12) United States Patent
Iren et al.

(10) Patent No.: US 7,958,331 B2
(45) Date of Patent: Jun. 7, 2011

(54) STORAGE DEVICE WITH OPPORTUNISTIC ADDRESS SPACE

(75) Inventors: Sami Iren, Pittsburgh, PA (US); Erik Riedel, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 983 days.

(21) Appl. No.: 11/638,614

(22) Filed: Dec. 13, 2006

(65) Prior Publication Data

US 2008/0148004 A1 Jun. 19, 2008

(51) Int. Cl.
*G06F 12/00* (2006.01)
(52) U.S. Cl. .................................. 711/202; 711/206
(58) Field of Classification Search .............. 711/202, 711/206
See application file for complete search history.

(56) References Cited

U.S. PATENT DOCUMENTS

| | | | | |
|---|---|---|---|---|
| 5,237,675 A | | 8/1993 | Hannon, Jr. ................. | 395/425 |
| 5,394,534 A | * | 2/1995 | Kulakowski et al. ......... | 711/112 |
| 5,537,588 A | * | 7/1996 | Engelmann et al. .......... | 707/202 |
| 5,666,560 A | | 9/1997 | Moertl et al. ................. | 395/888 |
| 5,734,677 A | | 3/1998 | Liew et al. .................... | 375/240 |
| 5,802,599 A | | 9/1998 | Cabrera et al. ............... | 711/170 |
| 6,449,689 B1 | * | 9/2002 | Corcoran et al. ............. | 711/113 |
| 6,954,876 B2 | | 10/2005 | Ogawa et al. ................ | 714/8 |
| 6,981,119 B1 | | 12/2005 | Lepak et al. ................. | 711/170 |
| 2002/0191692 A1 | | 12/2002 | Fallon et al. ................. | 375/240 |
| 2005/0086567 A1 | * | 4/2005 | Cronch ........................ | 714/746 |
| 2005/0257023 A1 | * | 11/2005 | Peng ............................ | 711/209 |
| 2006/0005069 A1 | | 1/2006 | Gaertner ...................... | 714/5 |
| 2006/0010151 A1 | * | 1/2006 | Star Sung .................... | 707/102 |
| 2007/0174582 A1 | * | 7/2007 | Feldman ...................... | 711/202 |

OTHER PUBLICATIONS

Hai Huang, Wanda Hung and Kang G. Shin, "FS2: Dynamic Data Replication in Free Disk Space for Improving Disk Performance and Energy Consumption," 2005, 14 pages.

* cited by examiner

*Primary Examiner* — Hashem Farrokh
(74) *Attorney, Agent, or Firm* — Alan G. Rego; Westman, Champlin & Kelly, P.A.

(57) ABSTRACT

A data storage device comprises storage media including physical data blocks. The data storage device comprises a storage circuit. The storage circuit compresses a user data block into a compressed user data block before storing the compressed user data in one of the physical data blocks, leaving an unused block portion of the physical data block. The data storage device comprises a remapping circuit that remaps the unused block portion to an opportunistic block address. The data storage device comprises a circuit that stores data in the unused block portion.

20 Claims, 10 Drawing Sheets

STORAGE DEVICE WITH OPPORTUNISTIC ADDRESS SPACE

FIELD OF THE INVENTION

The present invention relates generally to data storage devices, and more particularly but not by limitation to data storage drives.

BACKGROUND OF THE INVENTION

During a write operation, a disc drive receives user data blocks from a storage interface circuit in a host computer. The disc drive stores the user data blocks in addressable physical disc blocks on a disc in the disc drive. Generally, the user data blocks and the physical disc blocks are formatted with the same standard block size limit, for example, 512 bytes.

User file sizes on the host will vary, and the storage interface circuit in the host computer divides up user files into one or more user data blocks with the standard size limit. A last user data block associated with a file may be less than the standard size limit. When this last user data block is stored in a physical disc block, there is leftover, unused space in the physical disc block. Because of the block oriented storage method, the leftover, unused space is not accessible for use.

As a result, the amount of data that can be stored on the disc is considerably less than the storage available on the disc, particularly when there are a large number of small user files. Storage capacity has been increased somewhat by compressing files on the host before they are divided into user data blocks and sent to the disc drive, however, this file compression in the host does not make any use of the unused space in a physical block and uses up host processor time. There is a need to reduce the amount of unused, inaccessible space on data storage devices such as disc drives. There is a need to avoid lost host processor time that is used in compressing files.

The problem is not limited to data storage drives. The problem can also arise in other data storage devices (such as integrated circuit data storage devices) that receive user data blocks and that store the received data in storage that is organized into physical data blocks. The problem can arise in magnetic, magneto-optical, optical, ferroelectric and electronic data storage devices when the devices are organized in a block or block-like manner.

Embodiments of the present invention provide solutions to these and other problems, and offer other advantages over the prior art.

SUMMARY OF THE INVENTION

Disclosed is a data storage device. The data storage device includes storage media with physical data blocks. The data storage device includes a storage circuit. The storage circuit compresses a user data block into a compressed user data block before storing the compressed user data in one of the physical data blocks, leaving an unused block portion of the physical data block.

The data storage device comprises a remapping circuit that remaps the unused block portion to an opportunistic block address. The data storage device comprises a circuit that stores data in the unused block portion.

In one embodiment, the data storage device includes a disc drive. In another embodiment, the compressed user data stored in one block is also stored as a replica in the unused block portion. In yet another embodiment, the data storage device stores enhanced error correction codes.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
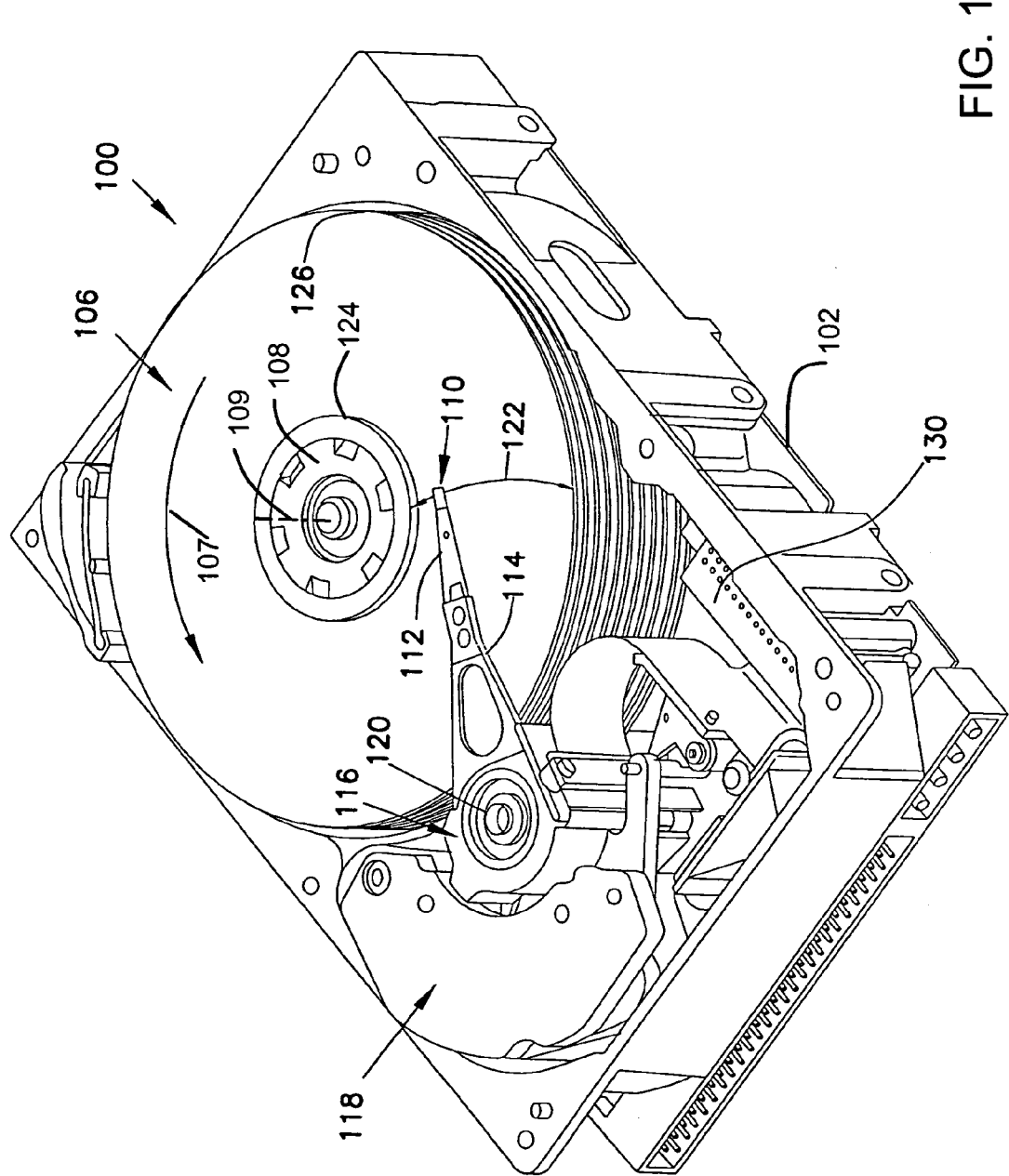
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown). The disc drive 100 illustrated in FIG. 1 is merely exemplary, and other types of data storage devices can be used as well.

Figure 2:
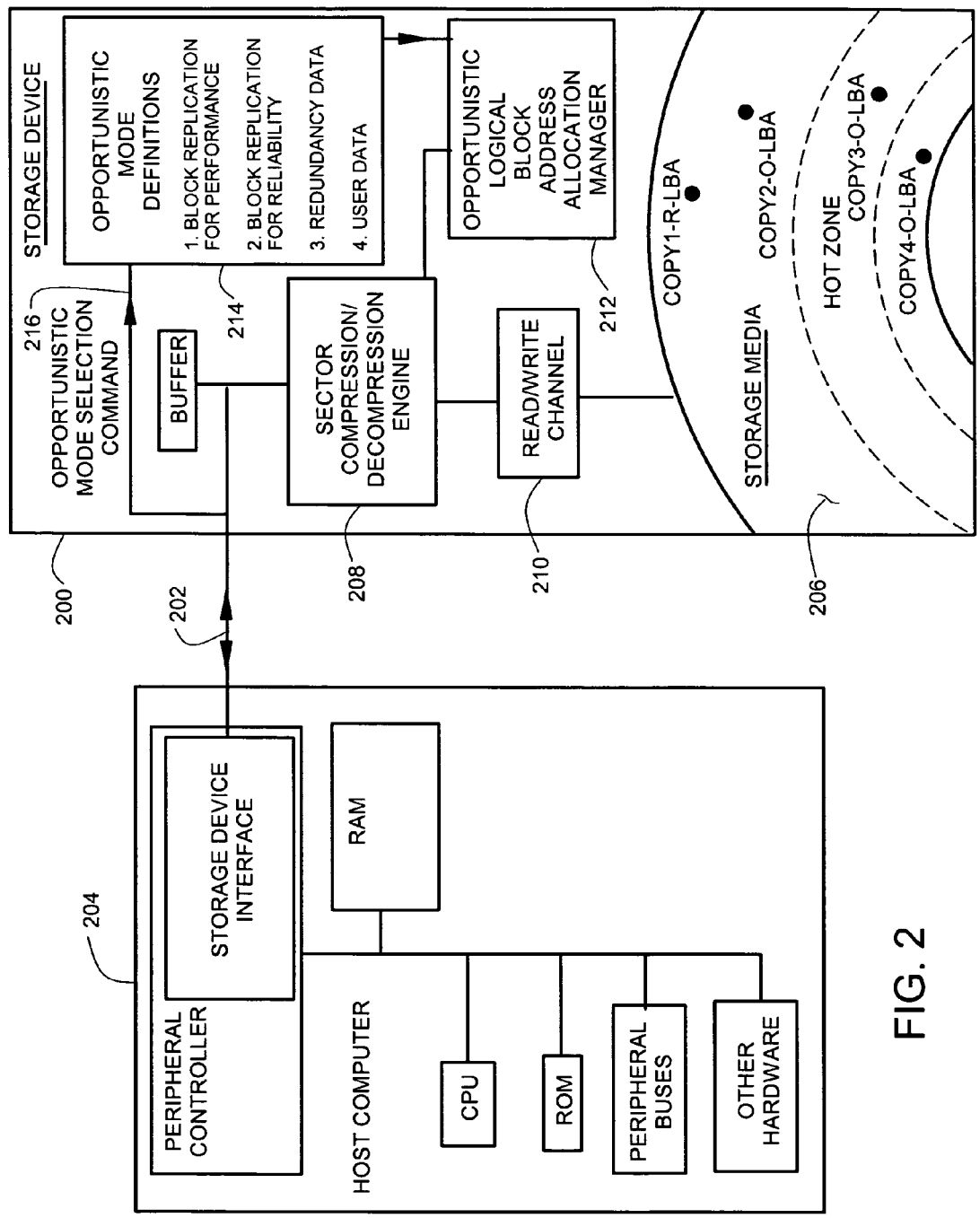
FIG. 2 illustrates a data storage device coupled via a bus to a host computer system.

FIG. 2 illustrates a data storage device 200 coupled via a bus 202 to a host computer system 204. The data storage device 200 comprises data storage media 206 that is accessed by a read/write channel 210. In one embodiment, the storage media 206 can comprise one or more storage discs in a data storage drive. In another embodiment, the storage media 206 can comprise an array of data blocks in an integrated circuit data storage device. The storage media 206 comprises a large number of physical data blocks of fixed size. In one embodiment, the fixed size of the physical data block is 4 kilobytes. Each physical data block has a physical location on the storage media 206 and is addressable at that physical location. In the case where the data storage device comprises a data storage drive, addressing is effected by movement of a read/write head to the physical address. In the case of integrated circuit data storage devices, addressing is accomplished by solid state switching. The address of a physical data block is referred to as a logical block address (LBA). In the case of a data storage drive, an LBA typically includes track and sector coordinates of the physical data block. In the case of an integrated circuit data storage device, an LBA typically includes solid state switching of connections to row and column busses.

When the host computer 204 provides a user data block to be stored to the data storage device 200, the user data block is coupled along bus 202 to a sector compression/decompression engine 208. The engine 208 detects characteristics of the user data block, and compresses the user data block if it is practical to compress the user data block. In one embodiment, the compression/decompression processes are lossless. Some user data blocks have a larger amount of redundant data, in other words highly repetitive data patterns, and can be practically compressed to generate a compressed user data block. Other user data blocks have little redundant data, in other words limited repeated patterns and can't be practically compressed. The engine 208 provides a user data block, which may be either compressed or not compressed, to the read/write channel 210 for storage. An opportunistic LBA allocation manager circuit 212 is coupled to the engine 208. The opportunistic LBA allocation manager circuit 212 associates a user data block provided by the host with a corresponding LBA's on the storage media 206. The engine 208 thus includes a storage circuit that receives user data blocks from the host 204, and that provides compressed user data blocks to both physical or regular (R-LBA) block addresses and virtual or opportunistic (O-LBA) block addresses, which are described in more detail below.

The user data block, as provided to the read/write channel 210, may be either compressed or uncompressed. The user data block may have a size that is smaller than a physical data block, in which case there is unused space left in the physical data block. A file on the host may have a size that is larger than a user data block, in which case the file is divided into multiple user data blocks which are transmitted to the data storage device 200. The last one of these multiple physical data blocks may be incompletely filled, leaving unused space in the last physical data block. The opportunistic LBA allocation manager circuit 212 keeps track of unused portions of physical data blocks. The opportunistic LBA allocation manager circuit 212 includes a re-mapping circuit that remaps multiple unused portions of used physical data block (R-LBA) addresses into opportunistic or virtual block addresses (O-LBA). These virtual block addresses provide additional addressable storage space that is beyond the nominal size of the storage media. An opportunistic mode definition circuit 214 is coupled to the opportunistic LBA allocation manager circuit 212. The mode definition circuit 214 defines the use of the opportunistic (virtual) storage space according to an opportunistic mode selection command 216 received from the host. The opportunistic storage space O-LBA can be used, for example, to replicate conventional physical data blocks for faster performance (mode 1), to replicate conventional physical data blocks for increased reliability (mode 2), to store redundancy data (error correction coding) (mode 3), or to present additional storage space to the host system (mode 4). Opportunistic operating modes are described in more detail below in connection with FIGS. 3-10.

Figure 3:
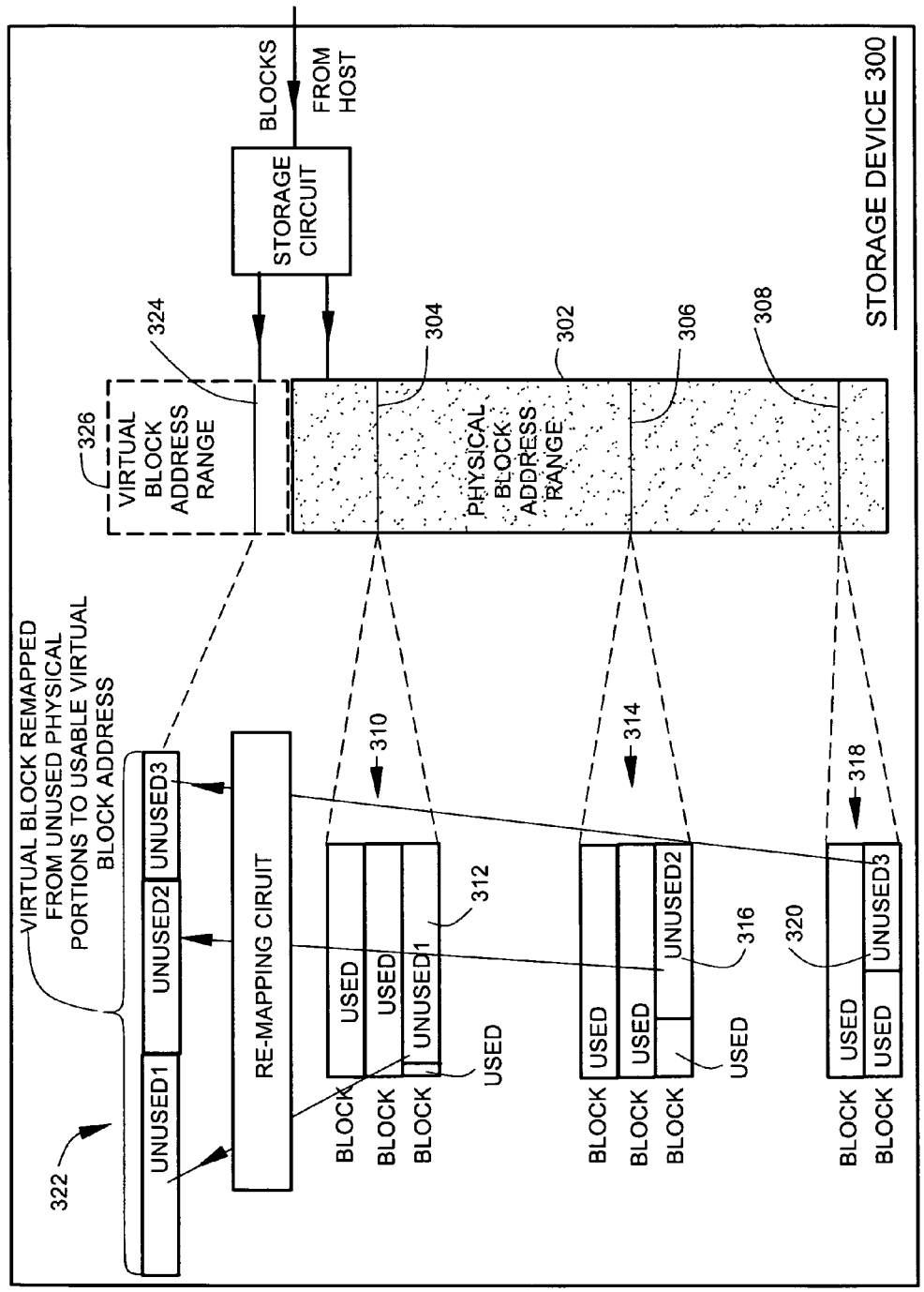
FIG. 3 illustrates storage space addressing in a data storage device.

FIG. 3 illustrates storage space addressing in a data storage device 300. The regular LBA's are mapped to a physical block address range 302. A file on the host has been broken up into first, second and third user data blocks. A first user data block is stored starting at a first physical block address 304. A second user data block is stored starting at a second physical block address 306. A third user data block is stored starting at a third physical block address 308. As illustrated at 310, the first user block fills two physical data blocks and a small portion of a third physical data block, leaving a portion UNUSED1 312 of the third physical data block unused and inaccessible to the R-LBA address space. As illustrated at 314, the second user data block fills two physical data blocks and a small portion of a third physical data block, leaving a portion UNUSED2 316 of the third physical data block unused and inaccessible to the R-LBA address space. As illustrated at 318, the third user data block fills one physical data block and a portion of a second physical data block, leaving a portion UNUSED3 320 of the second physical data block unused and inaccessible to the R-LBA address space. The unused portions 312, 316, 320 are assembled at 322 to form a virtual or opportunistic block. This opportunistic block is mapped into a virtual or opportunistic address O-LBA at 324 in an O-LBA address range 326.

Figure 4:
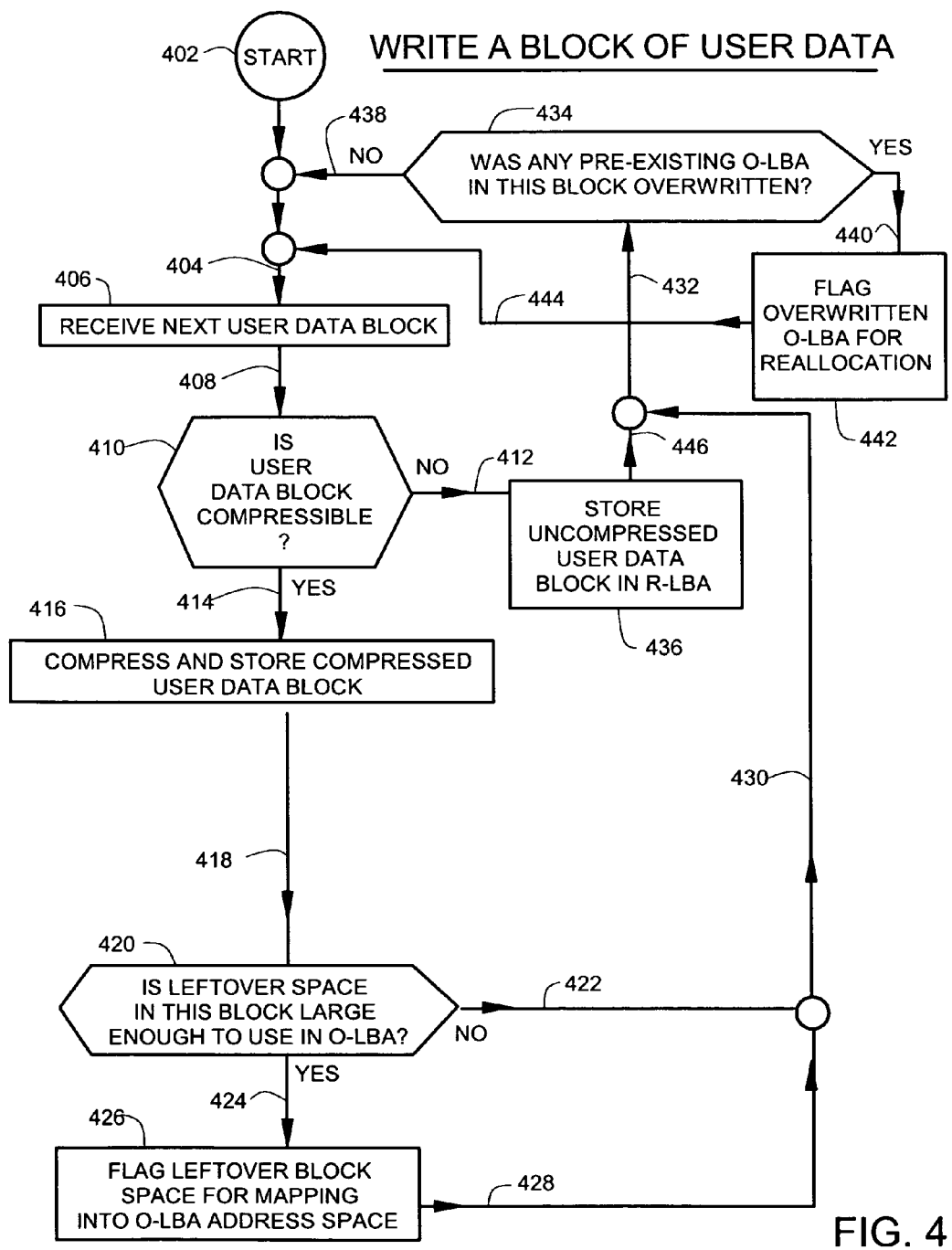
FIG. 4 illustrates an exemplary process of writing a block of user data.

FIG. 4 illustrates an exemplary process of writing a block of user data. The process starts at START 402 and continues along line 404 to action block 406. At action block 406, a next user data block is received by a compression engine. After completion of action block 406, processing continues along line 408 to decision block 410.

At decision block 410, the characteristics of the received user data block are detected to determine if the user data block is practically compressible. If the user data block is not compressible, then processing continues along line 412 to action block 436. If the user data block is compressible, then processing continues along line 414 to action block 416.

At action block 416, the user data block is compressed and stored on the storage media. In one embodiment, the compression is lossless. After completion of user data block 416, processing continues along line 418 to decision block 420.

At decision block 420, the physical data block is tested to find out if there is enough leftover storage space in the physical data block for the leftover space to be practically used for O-LBA. If there is not enough leftover space, then processing continues along lines 422, 430, 432 to decision block 434. If there is enough leftover space, then processing continues along line 424 to action block 426.

At action block 426, the usable leftover space is marked or flagged for mapping into O-LBA space. Flagging can be accomplished by a table of addresses, a log of changes or other known flagging methods. After completion of action block 426, processing continues along lines 428, 430, 432 to decision block 434. At decision block 434, if no pre-existing O-LBA was overwritten, then processing continues along lines 438, 404 to action block 406. At decision block 434, if pre-existing O-LBA was overwritten, then processing continues along line 440 to action block 442.

At action block 442, overwritten O-LBA is flagged for reallocation elsewhere in the O-LBA address space. After completion of action block 442, processing continues along lines 444, 404 to action block 406.

At action block 436, uncompressed user data is stored in R-LBA. After completion of action block 436, processing continues along lines 446, 432 to decision block 434.

Figure 5:
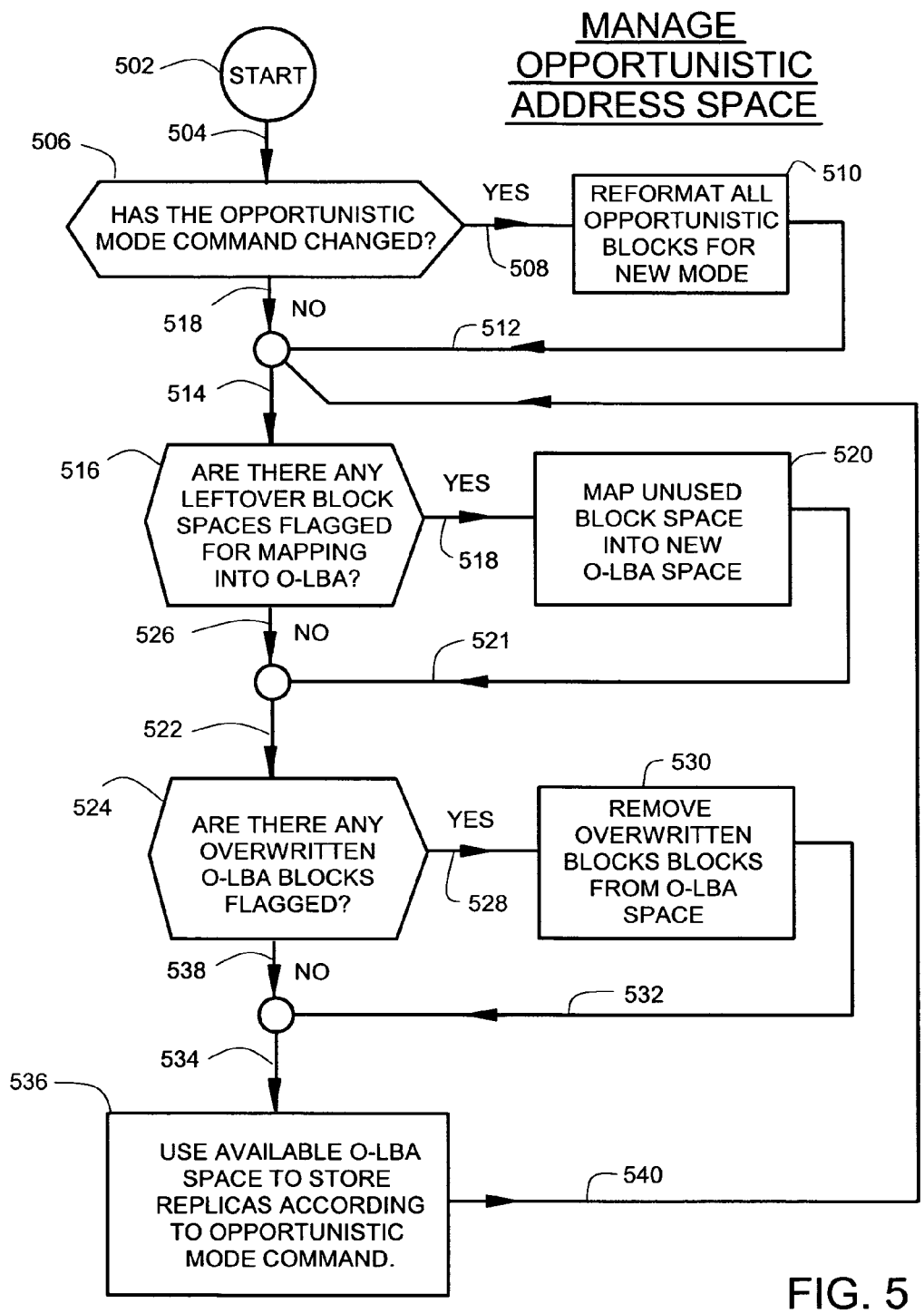
FIG. 5 illustrates an exemplary process of managing opportunistic address space.

FIG. 5 illustrates an exemplary process of managing opportunistic address space. Processing begins at START 502 and continues along line 504 to decision block 506.

At decision block 506, a check is made to find out if a command has been received from the host computer to change to a new opportunistic mode from a past opportunistic mode. If a change has been made, processing continues along line 508 to action block 510. At action block 510, the opportunistic address space is reformatted in preparation for use in the new opportunistic mode. After completion of action block 510, processing continues along lines 512, 514 to decision block 516. If there is no change in opportunistic mode at decision block 506, then processing continues along lines 518, 514 to decision block 516.

At decision block 516 a check is made to see if there are any leftover physical data block spaces flagged for mapping into O-LBA. If there are any flagged, then processing continues along line 518 to action block 520. At action block 520, unused physical data block spaces are mapped into new O-LBA space and processing continues along lines 521, 522 to decision block 524. If there are none found flagged at decision block 516, then processing continues along lines 526, 522 to decision block 524. At decision block 524, a test is made to see if any O-LBA blocks have been flagged as overwritten. If physical data blocks have been flagged as overwritten, then processing continues along line 528 to action block 530. At action block 530, overwritten physical data blocks are removed from the O-LBA address space and then processing continues along lines 532, 534 to action block 536. If there are no physical data blocks found flagged as overwritten at action block 524, then processing continues along lines 538, 534 to action block 536.

At action block 536, available O-LBA space is used to store replicas in mode 1 or mode 2 (or redundancy data in mode 3, or user files in mode 4) (as shown in FIG. 2) and then processing continues along lines 540, 514 to decision block 516.

Figure 6:
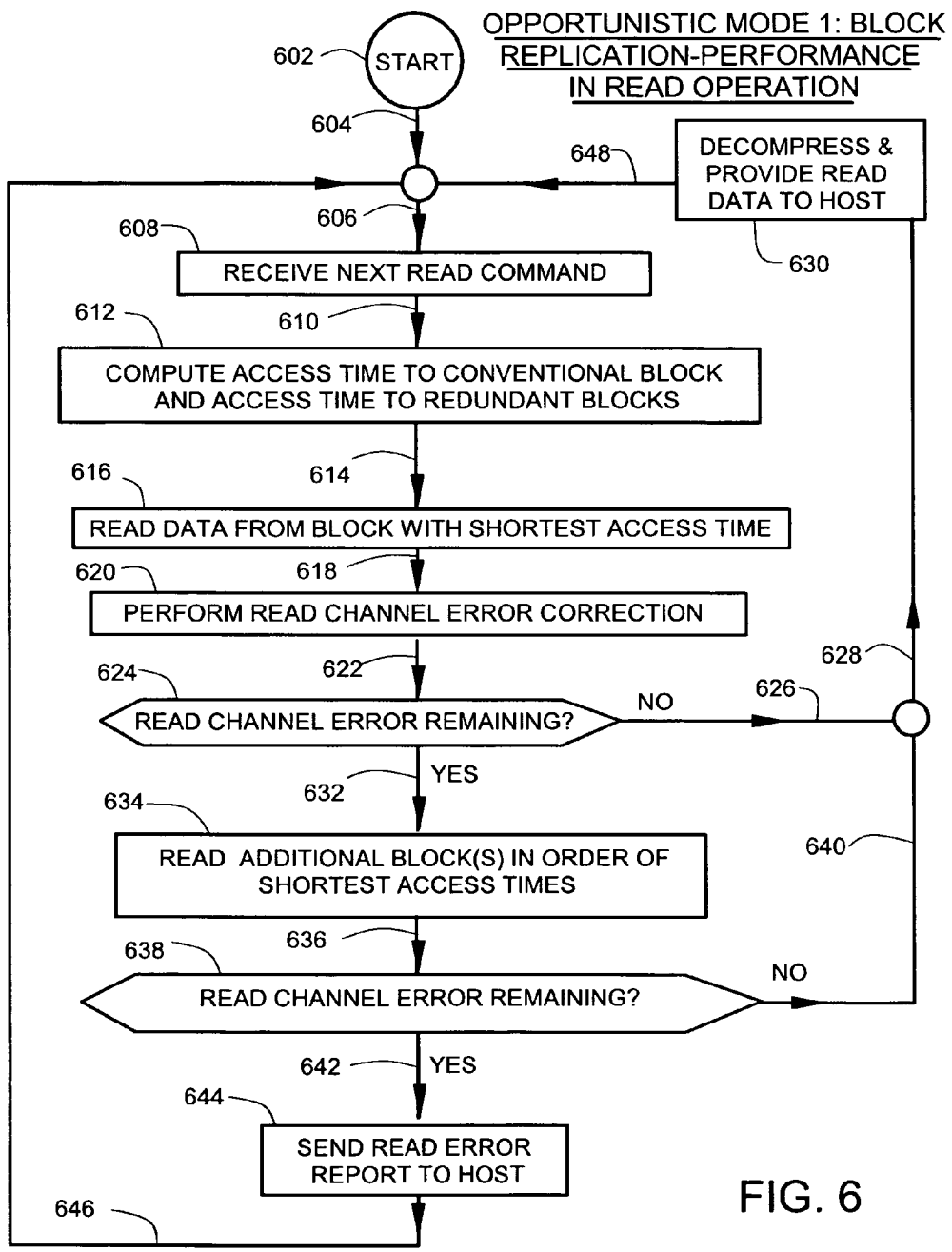
FIG. 6 illustrates an exemplary read process in mode 1.

FIG. 6 illustrates an exemplary read process in mode 1. Processing begins at START 602 and continues along lines 604, 606 to action block 608. At action block 608, a read command is received. After receipt of the read command, processing continues along line 610 to action block 612. At action block 612, calculations are made of access time to a conventional physical data block and also of access time to each associated redundant block are made. In the case of a disc drive, the access times comprise head seek and positioning times. After the calculations at action bock 612, processing continues along line 614 to action block 616. At action block 616, the physical data block that has the shortest calculated access time is addressed, and data is read from that physical data block. After reading the data, processing continues along line 618 to action block 620. At action block 620, read channel error correction is performed, either successfully or unsuccessfully. After completion of action block 620, processing continues along line 622 to decision block 624.

At decision block 624, if there are no errors remaining after the read channel error correction, then processing continues along lines 626, 628 to action block 630. At decision block 624, if there are errors remaining after the read channel error correction, then processing continues along line 632 to action block 634.

At action block 634, additional logical block addresses (e.g., redundant or conventional) are read until one is found that is correct after read channel error correction or until the last one is found if none can be corrected by the read channel error correction. After completion of action block 634, processing continues along line 636 to decision block 638.

At decision block 638, a test is made to see whether there are error remaining in the read physical data block. If there are no errors, then processing continues along lines 640, 628 to action block 630. If there are errors remaining at decision block 638, then processing continues along line 642 to action block 644. At action block 644, an error report is sent to the host, and processing continues along lines 646, 606 to action block 608.

At action block 630, the block which has been read is decompressed (as needed) and provided to the host as read data (along with other blocks that are part of the file being read). After completion of action block 630, processing continues along lines 648, 606 to action block 608.

Figure 7:
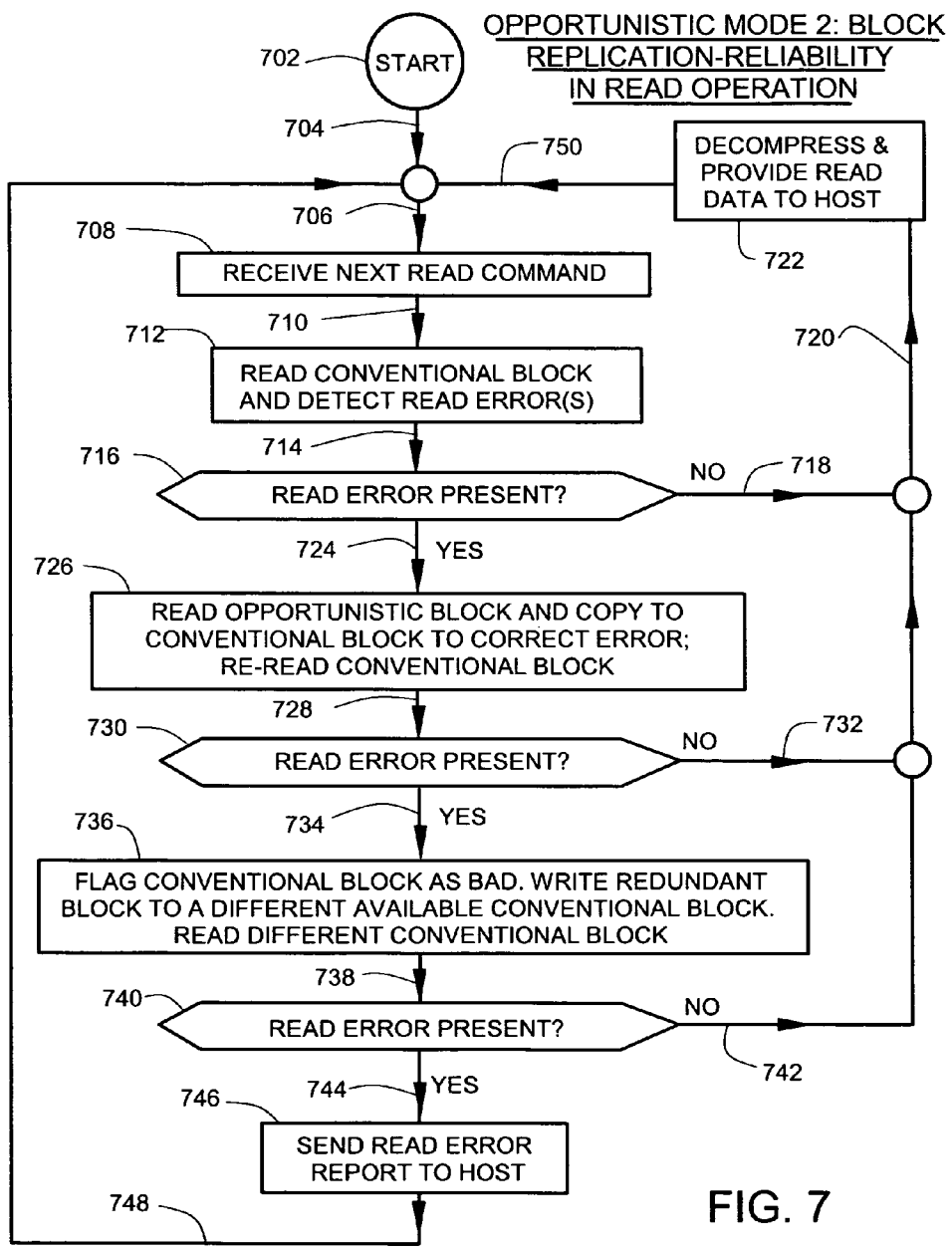
FIG. 7 illustrates an exemplary read process in mode 2.

FIG. 7 illustrates an exemplary read process in mode 2. Processing begins at START 702 and continues along lines 704, 706 to action block 708. At action block 708 a read command is received. After completion of action block 708, processing continues along line 710 to action block 712.

At action block 712, a conventional or regular R-LBA block is read and any errors are detect by the read channel. After completion of action block 712, processing continues along line 714 to decision block 716.

At decision block 716 a test is made to see if there are errors present in the physical data block that has been read. If errors are not present, then processing continues along lines 718, 720 to action block 722. If errors are present, then processing continues along line 724 to action block 726. At action block 726, an opportunistic O-LBA block (replicating the R-LBA block) is read and copied to the conventional block in an effort to correct the error in the conventional block. After completion of action block 726, processing continues along line 728 to decision block 730.

At decision block 730, a test is made to determine if there still errors present in the read data. If there are no errors present, then processing continues along lines 732, 720 to action block 722. If there are errors still present, then processing continues along line 734 to action block 736.

At action block 736, the conventional block is flagged as bad. A redundant block is written to a different available conventional block in an effort to correct the error. After completion of action block 736, processing continues along line 738 to decision block 740.

At decision block 740, a test is made to see if a read error is still present in the newly selected conventional block. If no read error is present, then processing continues along lines 742, 720 to action block 722. If a read error is still present, then processing continues along line 744 to action block 746. At action block 746, a read error report is sent to the host, and then processing continues along lines 748, 706 to action block 708.

At action block 722, the block is decompressed (if it is a compressed block) and provided to the host. After completion of action block 722, processing continues along lines 750, 706 to action block 708.

Figure 8:
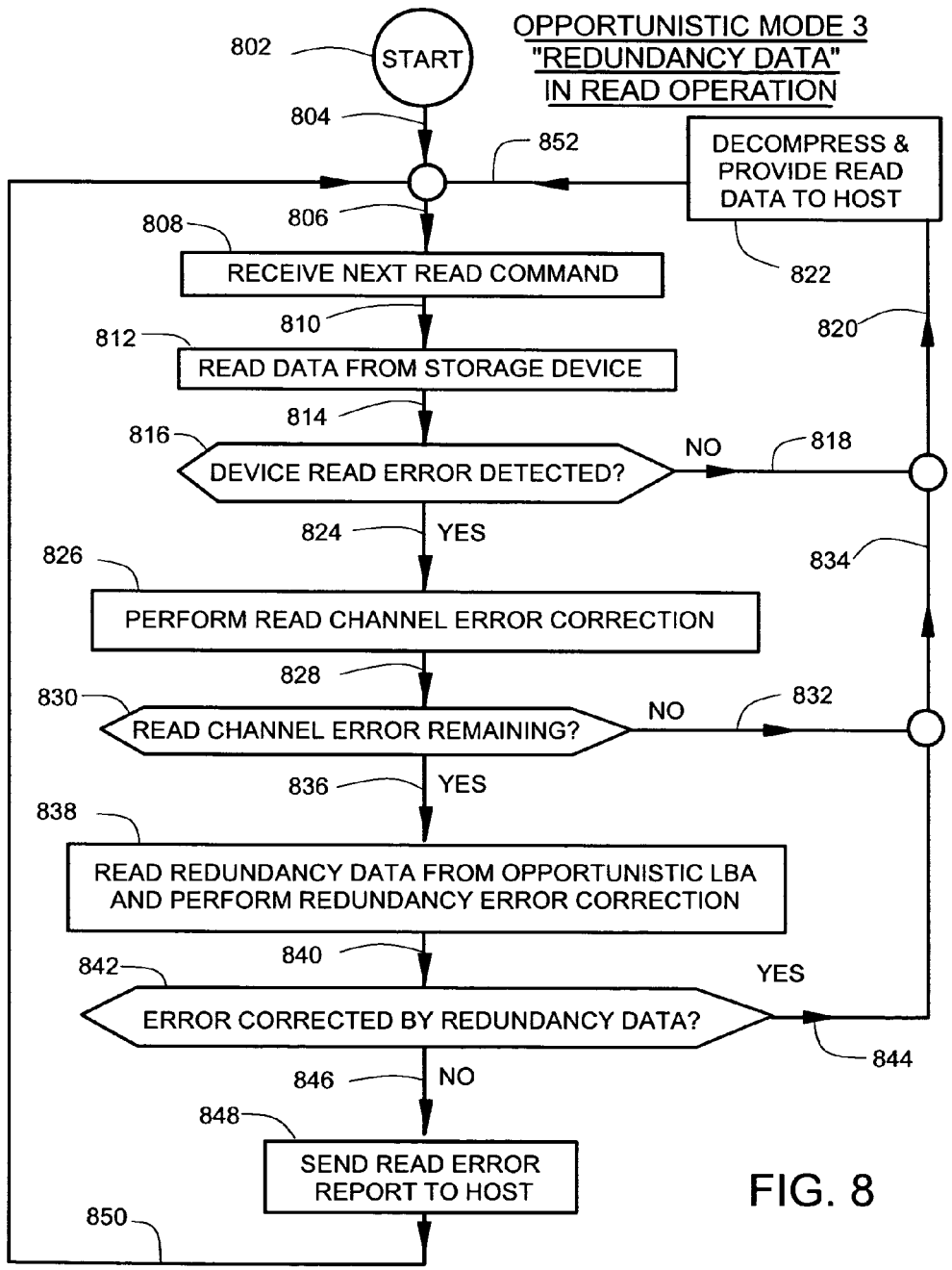
FIG. 8 illustrates an exemplary read process in mode 3.

FIG. 8 illustrates an exemplary read process in mode 3. Processing begins at START 802 and continues along lines 804, 806 to action block 808. At action block 808 a read command is received for reading an R-LBA block. After completion of action block 808, processing continues along line 810 to action block 812 where data is read from the storage media, which can be an integrated circuit storage array, a storage disc or a probe scanned ferroelectric surface. After completion of action block 812, processing continues along line 814 to decision block 816.

At decision block 816, a test is performed to see if there is a read error. If there is no read error, then processing continues along lines 818, 820 to action block 822. If a read error is detected at decision block 816, then processing continues along line 824 to action block 826. At action block 826, read channel error correction is performed in an effort to correct errors. After completion of action block 826, processing continues along line 828 to decision block 830.

At decision block 830, a test is performed to determine if there are remaining errors in the data read from the R-LBA block. If there are no errors remaining, then processing continues along lines 832, 834, 820 to action block 822. If there are errors remaining, then processing continues along line 836 to action block 838.

At action block 838, read redundancy data (supplementary error correction coding) is read from O-LBA and additional error correction is performed on the read data. After completion of action block 838, processing continues along line 840 to decision block 842.

At decision block 842, a test is made to see if the error correction performed at action block 838 was successful. If the error correction was successful, the processing continues along lines 844, 834, 820 to action block 822. If error correction was not successful, then processing continues along line 846 to action block 848. At action block 848, a read error report is sent to the host. After completion of action block 848, processing continues along lines 850, 806 to action block 808.

At action block 822, the block which was read is decompressed (if the block is a compressed block) and read data is provided to the host. After completion of action block 822, processing continues along lines 852, 806 to action block 808.

Figure 9:
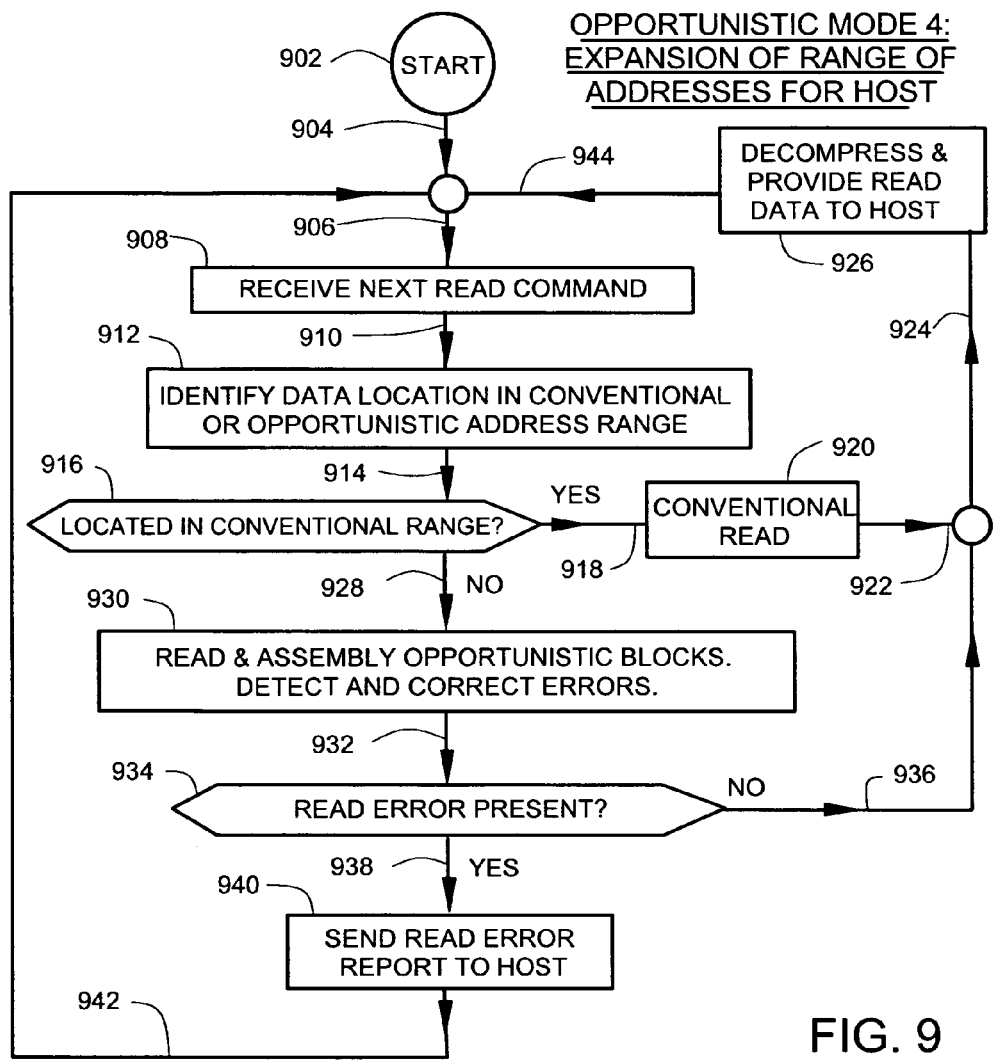
FIG. 9 illustrates an exemplary read process in mode 4.

FIG. 9 illustrates an exemplary read process in mode 4. Processing begins at START 902 and continues along lines 904, 906 to action block 908. At action block 908, a read command is received. After completion of action block 908, processing continues along line 910 to action block 912. At action blocks 912, storage locations of the data to be read is identified in either R-LBA or O-LBA ranges. After completion of action block 912, processing continues along line 914 to decision block 916.

At decision block 916, if the storage location is in a regular, conventional range, then processing continues along line 918 to action block 920. At action block 920, a conventional read operation is performed in the regular, conventional storage range. After completion of action block 920, processing continues along lines 922, 924 to action block 926.

At decision block 916, if the storage location is in an opportunistic address range, then processing continues along line 928 to action block 930. At action block 930, a number of opportunistic blocks are read and assembled into a read data block. Errors are detected and corrected in the read data block, and processing continues along line 932 to decision block 934.

At decision block 934, a test is performed to see if there are remaining errors in the assembled read data block. If no errors are present, processing continues along lines 936, 924 to action block 926. If errors are present, processing continues along line 938 to action block 940. At action block 940, a read error report is sent to the host. After completion of action block 940, processing continues along lines 942, 906 to action block 908.

At action block 926, the data block is decompressed (if needed) and sent to the host. After completion of block 926, processing continues along lines 944, 906 6o action block 908.

Storage space in a disc drive comprises of series of blocks (called sectors) that users (e.g., host file systems) can store information on. The sector size varies from drive to drive. Although on current drives the most common sector size is 512 bytes, the use of larger, 4 KB or larger sectors is expected to dominate the industry in the coming years. Each sector is mapped to a Logical Block Address (LBA) that users (file systems) use to store and retrieve their data.

Circuits in disc drives did not have access to host information on how these LBA's are used or whether they are used or not. Circuits in disc drives had to treat and protect all the LBA's as if they are fully used by the file system, even when only a portion of an LBA is used. This prevented them from using available space (unused LBA's) for other purposes such as improving performance and reliability by duplicating (mirroring) some of the blocks.

The existing LBA structure and lack of information available to circuits in the disc drive hindered any implementation of data compression that is part of the disc drive. Therefore, storage related compression was typically done at the system level on the host, either in the host file system or in a software application running on the host.

The embodiments described above in FIGS. 1-9 use compression in the data storage device to create an extended LBA range (i.e., extra capacity) that is maintained/mapped dynamically based on the content that is stored on the regular LBA range (i.e., default/normal capacity). This so called "opportunistic" LBA range can be freely used by the data storage device to improve reliability, performance, or power usage by using techniques such as block duplication/mirroring (modes 1 and 2) and advanced error correction codes (mode 3). It can also be presented to the host computers so that users have access to extra storage capacity (mode 4).

Data storage device capacity (i.e., an amount of information that can be stored on a data storage device) is a valuable asset for both users (for storing user data) and for the data storage device itself (for maintaining information for better performance, reliability, etc.). Therefore, research in the disc drive industry has focussed on increasing areal density. Other techniques such as compression have been left out for file systems and applications since they have been deemed infeasible with the current block based drive architectures.

Compression algorithms are typically more effective on large chunks of data. Since disc drives lack any information to link LBA's (sectors) together, compression can only be done at the sector level. With the current use of 512-byte sectors, any expected gain from compression is minimal. Compressing multiple sectors at a time would not be as effective and would degrade drive performance due to read-modify-write requirements for sector updates. The embodiments described above in connection with FIGS. 1-9, however, provide good compression and do not negatively affect drive performance.

In the embodiments described above, a compression engine is part of the data storage device design. This compression engine compresses any data before writing it to the disc and uncompresses when it is read from the disc.

Two types of LBA's are included. Regular LBA's (R-LBA's) are the same as what exists on today's hard drives. The R-LBA's are the drive's default (guaranteed) capacity. Opportunistic LBA's (O-LBA's) are created dynamically based on how well the data on R-LBA's are compressed.

Figure 10:
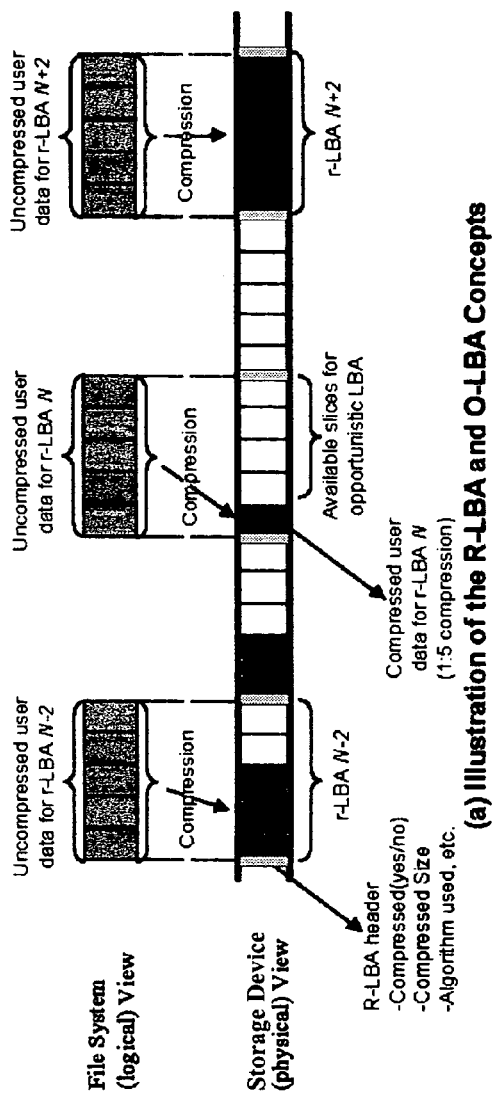
FIG. 10 illustrates opportunistic address space.

When a "write" request comes for an R-LBA, user data is compressed before storing it on the disc. Since compressed data occupies less space than the full LBA size, the remaining portion of the R-LBA is used as portions of opportunistic LBA's (O-LBA's) if the remaining portion is large enough. A dynamic table keeps track of O-LBA's and their corresponding physical locations on the disc as shown in FIGS. 3, 10. The size of an O-LBA can be made smaller than the size of an R-LBA (as in FIG. 10B) or the same size as R-LBA (as in FIG. 10C) by allocating multiple slices from various R-LBAS for a single O-LBA. A slice is a subset of an R-LBA. For example, if the R-LBA size on a drive is 4096 bytes (4 kbytes), a slice might be 512 bytes, and an R-LBA would contain 8 of these slices. If the O-LBA size is chosen to be one slice (512 bytes), an R-LBA might accommodate up to 7 O-LBA's depending on how well the user data compresses (assuming at least one slice will be used for compressed user data). In FIG. 10B, R-LBA size is 5 slices and O-LBA size is 1 slice. In FIG. 10C, both R-LBA and O-LB-A are the same size, 5 slices each.

O-LBA table is dynamically updated as O-LBA's are relocated or deleted due to changes in the size of the compressed user data. For example if R-LBA "N" in FIG. 10 is modified by the user, and the newly compressed data is larger than one slice, the O-LBA's that are currently mapped to slices 2-5 of R-LBA "N" either have to be relocated onto other available space or completely discarded. Therefore, unlike R-LBA's. O-LBA's are not tied to a physical location on the disc, and the number of existing O-LBA's on a drive can change dynamically based on how much compression can be achieved on the existing user data.

There are many cases where the newly created extra space (O-LBA's) can be used. For example, in modes 1, 2, a very effective use might be combining this technique with dynamic data replication. Free disc space is used to replicate frequently accessed data to improve drive performance and power usage. Since information about frequent access is required to use this technique, and allocation of storage space is required, it has typically been done only in the host system. However, when combined with opportunistic free space (O-LBA's) described in the embodiments above, dynamic data replication is implemented in the disc drive itself and is a powerful tool to improve performance, reliability, and power requirements at the same time. From a user's (host file system) point of view, the operation in internal to the disc drive, and the disc drive operates as usual without any additional support from the host system. There is a well-defined LBA range (R-LBA's) that the user is familiar with and it uses that range as with any other hard drive. In the background, however, the disc drive creates the O-LBA's as R-LBA's (user data) are written to the disc. A current set of O-LBA's is maintained in the dynamic O-LBA table as shown in FIG. 10. The disc drive uses these O-LBA's to replicate user data (R-LBA's). Replication process can be optimized to minimize seeks (thereby improving drive performance and power consumption) or to maximize reliability. In the former case, frequently accessed user data (R-LBA's) are replicated into the hot regions of the drive. Hot regions are those regions where disc head spends most of its time. When a request comes for the user data (R-LBA) disc drive chooses between the original copy (R-LBA) and the replica (O-LBA) based on current position of the disc head (or whichever is most efficient to serve). This not only reduces the seeks (hence improves the drive performance and power usage) but also improves the reliability for those user data that are duplicated. If the original data (R-LBA) is damaged for some reason, user data can still be recovered from the O-LBA.

In the latter case where replicas are used to optimize reliability, user data (R-LBA) to be replicated can be chosen based on sensitivity of the information. An LBA located in an area of the disc that is frequently overwritten might be at a greater risk of corruption (i.e., more sensitive) than another LBA on any other part of the disc. A SMART log page also provides useful information (such as read and write error logs) that can be used to determine sensitivity of LBA's. Once these LBA's are identified they can be replicated on those sections of the drive that will give them best protection. For example, replicas can be created on different platters within a disc drive so that even in the case of a head crash, user data can be recovered. Note that, although this version is optimized for reliability, it also improves seek and positioning time due to availability of duplicate information.

Information about the duplicate blocks are kept in a separate table and used by the disc scheduler for efficiently scheduling of requests. Depending on the current position of the disc head, the request is serviced from either the original data or the replica.

In mode 3, the extra space is used to improve reliability of the drive by using enhanced error correction codes. This might include additional parity information, Reed-Solomon codes or simply extended ECC codes with more redundancy to protect better protection.

In mode 4, the O-LBA's are exposed (made available) to users so that they can take advantage of the extra storage capacity. This use case is different than the first three in the sense that it is not transparent to the user. In modes 1, 2, 3, O-LBA's are completely transparent to users and advantages come at no expense to users. Regular drive performance is not affected because replication takes place in the background (at idle time). When an R-LBA update overflows into those slices that are used by an O-LBA, that O-LBA can simply be discarded (and deleted from the O-LBA table) so that R-LBA update time is not affected due to relocation of the O-LBA's. This can be afforded because information stored in the O-LBA's are redundant and can easily be regenerated from the original data and stored on some other O-LBA on the drive.

When O-LBA's are used for user data in mode 4, on the other hand, R-LBA updates might be delayed until some O-LBA's are relocated. Since there are no extra copies, overwriting the user data in the O-LBA range is not an option. Note that this only happens if the overwrite of R-LBA expands the existing data. This might happen due to the fact that compression ratio on the new data might be smaller than the compression ratio on the existing data. There are schemes that might overcome this problem. A simple scheme is over-allocating some slices for the R-LBA's to leave some room for expansion. For example, in FIG. 10, R-LBA N uses only one slice and the remaining four slices are used by O-LBA's 3-6. If two slices are reserved for R-LBA N (one for current data and one spare for future expansion), and three are used by O-LBA's, then most R-LBA updates should not require any immediate data relocation. The drive can still relocate some O-LBA's in the background as needed for future expansion, but drive performance should not be affected.

Since an available number of O-LBA's will vary depending on how well the user data in the R-LBA range compresses, special attention must be given to the use of O-LBA's. One option is to provide users with special commands to claim/allocate and free O-LBA's so that they can use this extra capacity whenever appropriate (i.e., when data on R-LBA's compresses well). Another option is to conservatively estimate the expected compression ratio for the target applications of the drive. For example, if the expected compression ratio for the desktop applications is 2 to 1, a 100 GB drive can accommodate up to 200 GB of data. By using a conservative estimate, this drive can be used as a 150 GB drive, still leaving some room for errors or unexpected data types. This option might not be advisable for all the user segments, but certain user segments can take advantage of the extra drive capacity.

Using compression at the disc drive level has not been considered as an option up until now due to the fact that very limited information is available at the drive level. With the smaller sector sizes and no way to relate the sectors with each other, compression was left out of the drive for file systems and applications to handle. The embodiments described above takes advantage of the upcoming large sector sizes to create extra capacity on the drive that can be used to greatly improve drive performance (seek and positioning time), reliability, or power requirements. Using block level compression a new class of LBA's (called "Opportunistic LBA's") is created. These new LBA's are used to dynamically duplicate user data on the drive for improving seek and positioning time and reliability of the drive. The whole process is completely transparent to the user and no changes are required to the drive interface. Other possible use cases for the O-LBA's include storing advanced redundancy data or exposing the extra capacity to the user.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. While the preferred embodiments described herein are directed to a block organized data storage device, it will be understood by those skilled in the art that the teaching of the present invention can be applied to data storage devices which are organized as object based data storage devices. In addition, although the preferred embodiment described herein is directed to a disc drive system for data storage, it will be appreciated by those skilled in the art that the teachings of the present invention can be applied to ferroelectric probe storage and integrated circuit storage devices, without departing from the scope and spirit of the present invention.

What is claimed is:

1. A data storage device, comprising:
   storage media including physical data blocks, wherein each physical data block is associated with a respective logical block address;
   a plurality of new logical block addresses;
   a mapping circuit that maps multiple unused portions of physical data blocks to a single new logical block address of the plurality of new logical block addresses, wherein each unused portion is located at a distinct physical data block; and
   a circuit that stores data in the new logical block address.

2. The data storage device of claim 1 further comprising a storage circuit that compresses a user data block into compressed user data and stores the compressed user data in at least one of the physical data blocks, leaving an unused portion of at least one physical data block.

3. The data storage device of claim 2 wherein the compressed user data is stored as a replica in the unused portion.

4. The data storage device of claim 3 wherein the data storage device selects either the compressed user data or the replica to be read, wherein the selection is made to enhance read speed.

5. The data storage device of claim 3 wherein the data storage device selects either the compressed data or the replica to be read, the selection being made to decrease power consumption.

6. The data storage device of claim 1 wherein the data storage device stores enhanced error correction codes associated with the data.

7. The data storage device of claim 1 wherein the data storage device stores user data in the unused block portions.

8. The data storage device of claim 1 wherein the unused portions comprising the new logical block address equal a same amount of data storage space as a contiguous physical data block.

9. The data storage device of claim 1 wherein each unused portion has a smaller size than a physical data block.

10. The data storage device of claim 1 wherein the data storage device comprises a disc drive.

11. The data storage device of claim 1 wherein the data storage device comprises an integrated circuit storage device.

12. The data storage device of claim 1 wherein each of the unused portions of the physical data blocks are greater than a threshold amount of data storage but less than a whole amount of data storage for the respective physical data block.

13. The data storage device of claim 1 wherein the mapping circuit determines when an unused portion of the physical data blocks that has been mapped to the new logical block address has been written and is no longer available for use by the new logical block address.

14. The data storage device of claim 1 wherein the mapping circuit maps further unused portions of the physical data blocks to a further single new logical block address of the plurality of new logical block addresses.

15. A data storage device, comprising:
    storage media including physical block addresses that represent physical blocks used for data storage, the physical block addresses being mapped to first logical block addresses to form a one-to-one relationship between each different physical block address and each respective first logical block address;
    a re-mapping circuit that remaps multiple unused portions of used physical blocks into a single new logical block address; and
    a storage circuit that receives data from a host, and that provides the data to the new logical block address.

16. The data storage device of claim 15 wherein the data provided to the new logical block address is a replica of compressed received data stored in the physical blocks.

17. The data storage device of claim 16 wherein the data storage device selects either the compressed data or the replica to be read to enhance speed.

18. The data storage device of claim 16 wherein the data storage device selects either the compressed data or the replica to be read to decrease power consumption.

19. A method of storing data, comprising:
    mapping physical block addresses that represent physical blocks for data storage to first logical block addresses to form a one-to-one relationship between each different physical block address and each respective first logical block address; and
    remapping multiple unused portions of used physical blocks to second logical block addresses;
    wherein each of the unused portions has a smaller size than a physical block of the physical blocks.

20. The method of claim 19 further comprising storing replicas of user data in the multiple unused portions of the used physical blocks to the second logical block addresses.

* * * * *